US007780076B2

(12) United States Patent
Kadowaki et al.

(10) Patent No.: US 7,780,076 B2
(45) Date of Patent: Aug. 24, 2010

(54) PAPER CURRENCY HANDLING APPARATUS

(75) Inventors: Minoru Kadowaki, Toyota (JP); Riichi Kato, Nagoya (JP); Atsuko Uozumi, Owariasahi (JP); Shinji Shibata, Nagoya (JP); Junji Fujita, Nagoya (JP)

(73) Assignee: Hitachi-Omron Terminal Solutions, Corp., Tokyo (JP)

(*) Notice: Subject to any disclaimer, the term of this patent is extended or adjusted under 35 U.S.C. 154(b) by 251 days.

(21) Appl. No.: 11/936,826

(22) Filed: Nov. 8, 2007

(65) Prior Publication Data

US 2008/0121722 A1 May 29, 2008

(30) Foreign Application Priority Data

Nov. 9, 2006 (JP) ............................ 2006-303496

(51) Int. Cl.
*G06Q 40/00* (2006.01)
*G07D 11/00* (2006.01)
*G07F 19/00* (2006.01)

(52) U.S. Cl. ...................................................... 235/379

(58) Field of Classification Search .................. 235/379
See application file for complete search history.

(56) References Cited

U.S. PATENT DOCUMENTS 4,625,870 A * 12/1986 Nao et al. ................... 209/534
4,883,183 A 11/1989 Kimura et al.
5,021,639 A * 6/1991 Hara et al. .................. 235/379
5,534,682 A * 7/1996 Graef et al. ................. 235/379
6,352,254 B1 3/2002 Kimura et al.
2002/0014736 A1 * 2/2002 Katou et al. ................ 271/126
2005/0017428 A1 * 1/2005 Ichikawa et al. ........... 271/3.14
2007/0034683 A1 * 2/2007 Eastman et al. ............. 235/379
2007/0045396 A1 * 3/2007 Kitagawa et al. ............ 235/379

FOREIGN PATENT DOCUMENTS

EP 1 571 603 9/2005
JP 2003-208654 7/2003

* cited by examiner

*Primary Examiner*—Michael G Lee
*Assistant Examiner*—David Tardif
(74) *Attorney, Agent, or Firm*—Antonelli, Terry, Stout & Kraus, LLP.

(57) ABSTRACT

In a paper currency handling apparatus, a temporary housing is arranged behind a paper currency deposit and withdrawal port; a paper currency discrimination part is arranged behind the temporary housing; conveyance paths conveying a paper currency from below the paper currency let-out part to ahead of the paper currency discrimination part, conveyance paths conveying a paper currency from behind the paper currency discrimination part to the temporary housing once ascending upward, and a paper currency sorting gate going from behind the paper currency discrimination part to the conveyance path to implement sorting to conveying destinations for a first time are included, wherein the paper currency sorting gate is arranged in an upper part behind the temporary housing.

10 Claims, 6 Drawing Sheets

PAPER CURRENCY HANDLING APPARATUS

INCORPORATION BY REFERENCE

The present application claims priority from Japanese application JP2006-303496 filed on Nov. 9, 2006, the content of which is hereby incorporated by reference into this application.

BACKGROUND OF THE INVENTION (1) Field of the Invention

The present invention relates to a paper currency handling apparatus to be mounted on an automatic cash dealing apparatus used in a financial institution, for example.

(2) Description of Related Art

Conventionally, a paper currency handling apparatus mounted on an automatic cash dealing apparatus used in a financial institution, for example comprises: a paper currency deposit and withdrawal port functioning to let out paper currencies deposited by a user one by one and functioning to discharge withdrawn paper currencies; a paper currency discrimination part discriminating deposited paper currencies or withdrawn paper currencies; a temporary housing for temporarily housing the deposited paper currency; a reject box housing rejected paper currencies which do not reach a predetermined standard at the paper currency discrimination part; a recycle box housing/storing the deposited paper currencies and letting out them as withdrawn paper currency; and a paper currency conveyance path bringing those respective units into connection.

In such a paper currency handling apparatus, diversification in monetary type and increase in capacity have progressed recently. Thereby, a recycle box is generally arranged in line in the lower part of the apparatus and the other portions are arranged by being integrated into the upper unit in the upper part of the paper currency handling apparatus (see JP-A-2003-208654).

In the paper currency deposit and withdrawal machine in the above described patent document, a paper currency deposit and withdrawal port, a paper currency discrimination part and a temporary housing are arranged in an upper unit in the upper part of the apparatus to discriminate the deposited paper currency with the paper currency discrimination part and convey the paper currency discriminated as acceptable to the temporary housing. Therefore, the deposit and withdrawal port and the temporary housing are arranged to sandwich the paper currency discrimination part in this order. Thus, in general, in a paper currency deposit and withdrawal machine, a deposit and withdrawal port, a paper currency discrimination part and a temporary housing are arranged in this order from the head of the apparatus.

Here, in order to discriminate paper currencies with the paper currency discrimination part to convey only acceptable paper currencies to the temporary housing, it is necessary to sort the paper currencies to the conveyance destinations based on the discrimination results of the paper currency discrimination part. And a certain amount of time is required for discrimination with a paper currency discrimination part. It is necessary to sort paper currencies to the temporary housing or the deposit and withdrawal port after a wait until a discrimination result is obtained after a paper currency passes the paper currency discrimination part. In order to buy time for the certain amount of time, the back stage of the paper currency discrimination part is provided with a conveyance path for buying time and that back stage of the conveyance path is provided with sorting branch paths. In order to provide that conveyance path, it is necessary to make the upper unit of the paper currency deposit and withdrawal machine large in the longitudinal direction or in the vertical direction.

However, in the recent years, reduction in size and increase in capacity for reducing size in the entire size of the paper currency deposit and withdrawal machine and increasing the paper currency housing capacity is required. Therefore, increase in size of the upper unit has been against the demand from the market.

BRIEF SUMMARY OF THE INVENTION

In view of the above described problems, an object of the invention is to provide a paper currency handling apparatus persistent to the demand for reduction in size and increase in capacity and to establish satisfactory progress for users.

The present invention is a paper currency handling apparatus, comprising a temporary housing being arranged behind a paper currency deposit and withdrawal part; a paper currency discrimination part being arranged behind the temporary housing; a first conveyance path conveying a paper currency from below the paper currency let-out part to ahead of the paper currency discrimination part; a second conveyance path conveying a paper currency from behind the paper currency discrimination part to the temporary housing once ascending upward; and a first branch part going from behind the paper currency discrimination part to the second conveyance path to implement sorting to conveying destinations for a first time, wherein the first branch part is arranged in an upper part behind the temporary housing.

The invention can provide a paper currency handling apparatus persistent to the demand for reduction in size and increase in capacity to improve the satisfaction level of users.

Other objects, features and advantages of the invention will become apparent from the following description of the embodiments of the invention taken in conjunction with the accompanying drawings.

DETAILED DESCRIPTION OF THE INVENTION

An embodiment of the present invention together with the drawings will be described below.

Example 1

Figure 1:
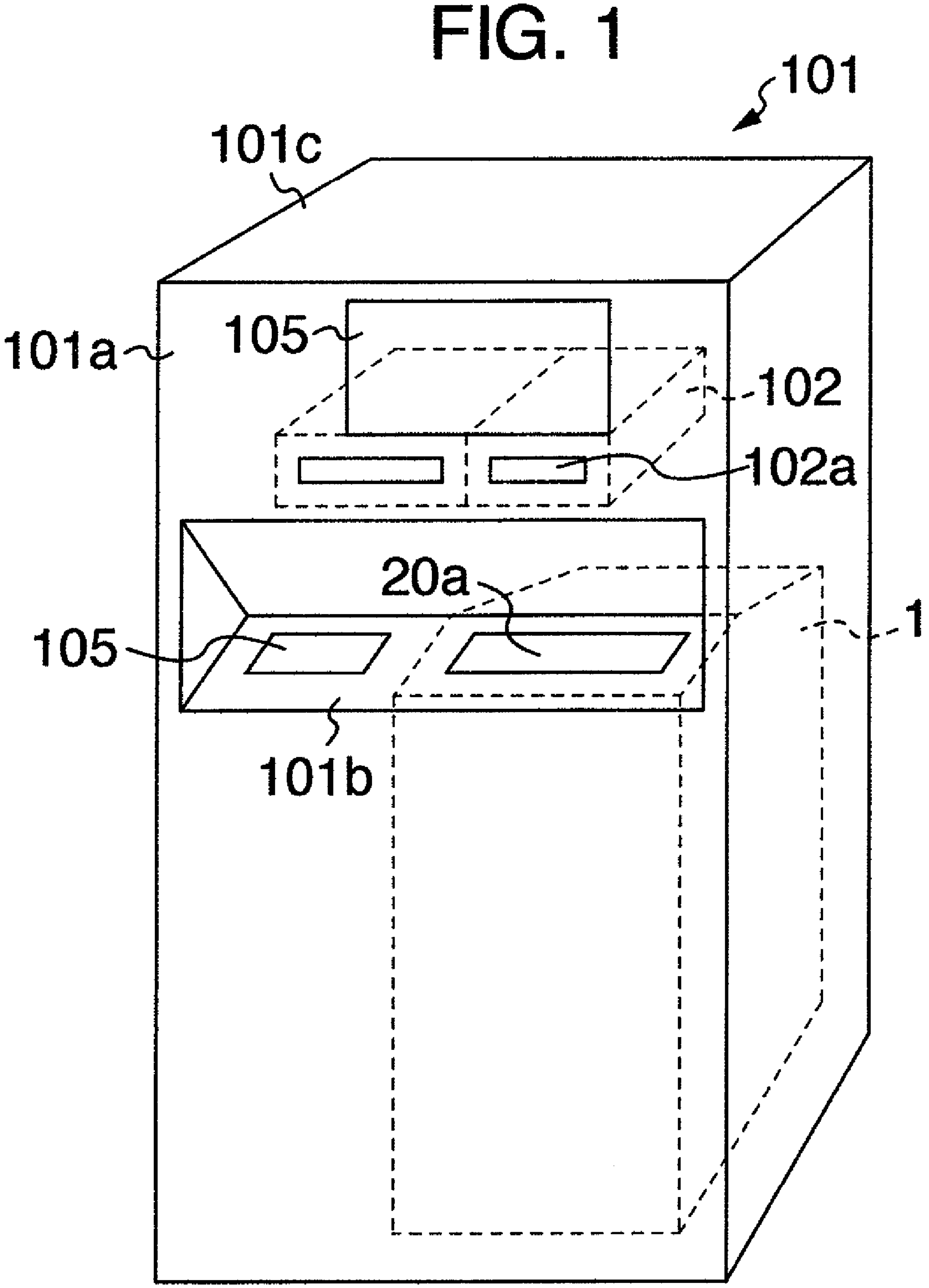
FIG. 1 is a perspective view illustrating an appearance of an automatic cash dealing apparatus.

FIG. 1 is a perspective view illustrating an appearance of an automatic cash dealing apparatus.

An automatic cash dealing apparatus 101 comprises, in its left interior, a card and ATM receipt processing mechanism 102 communicating with a card slot 102*a* provided in an upper front plate 101*a* to process cards of users, print and discharge ATM receipts and a customer operation part 105 displaying contents of dealing and receiving inputs. The automatic cash dealing apparatus 101 in its entirety is surrounded by an apparatus enclosure 101*c*. The automatic cash dealing apparatus 101 comprises, in its right interior, a paper currency handling apparatus 1 processing paper currencies with an inclined upper front plate 101*b* provided with a deposit and withdrawal port shutter 20*a*. That automatic cash dealing apparatus 101 with its front surface as a service interface carries out processing such as depositing, payment and transfer by users through cards, paper currencies and ATM receipts.

Figure 2:
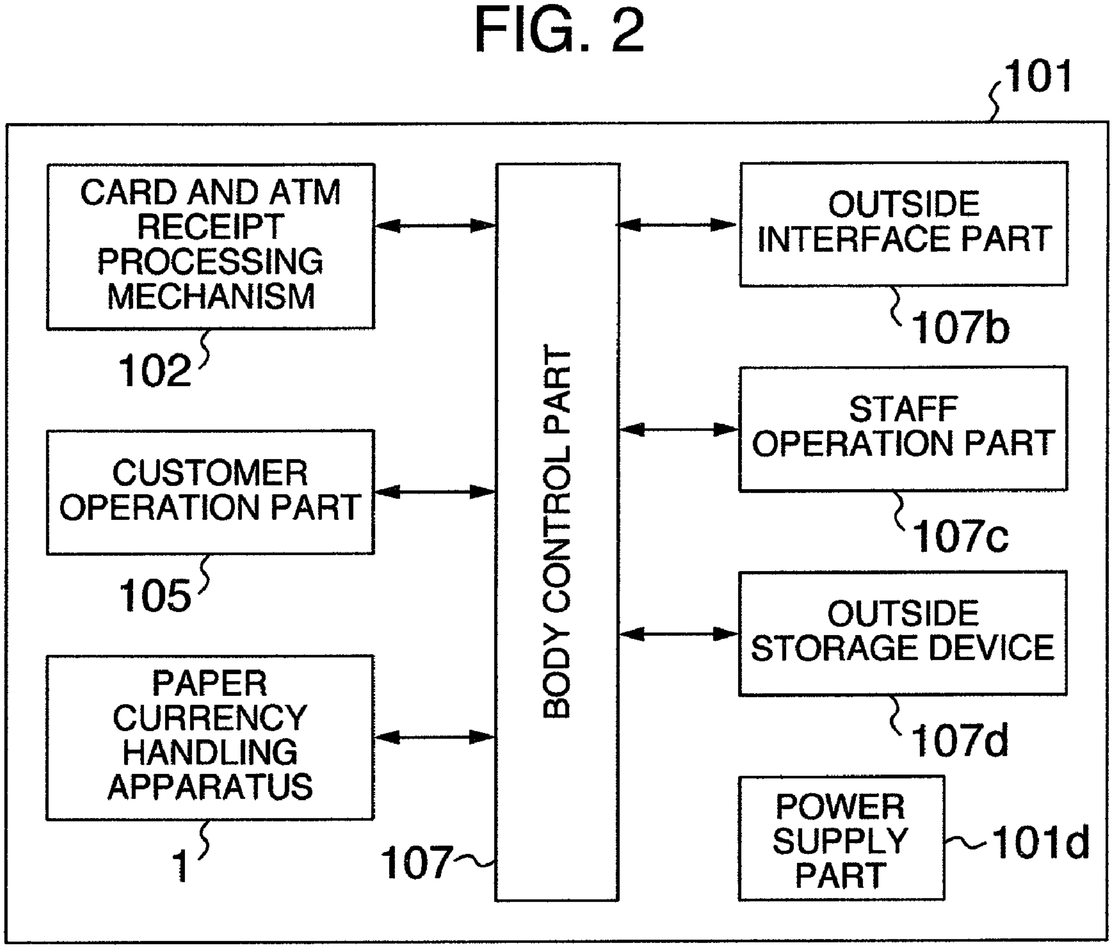
FIG. 2 is a control block diagram illustrating control relation of the automatic cash dealing apparatus.

FIG. 2 is a control block diagram illustrating control relation of the automatic cash dealing apparatus 101.

The card and ATM receipt processing mechanism 102, the paper currency handling apparatus 1 and the customer operation part 105 housed in the automatic cash dealing apparatus 101 are respectively connected to the body control part 107 with wiring such as a USB to carry out required operations under control of the body control part 107. In addition, an outside interface part 107*b*, a staff operation part 107*c* and an outside storage device 107*d* are connected to the body control part 107 by bus connection and the like to carry out required data exchange. Here, 101*d* denotes a power supply part supplying the above described respective mechanism portions and components with electric power.

Figure 3:
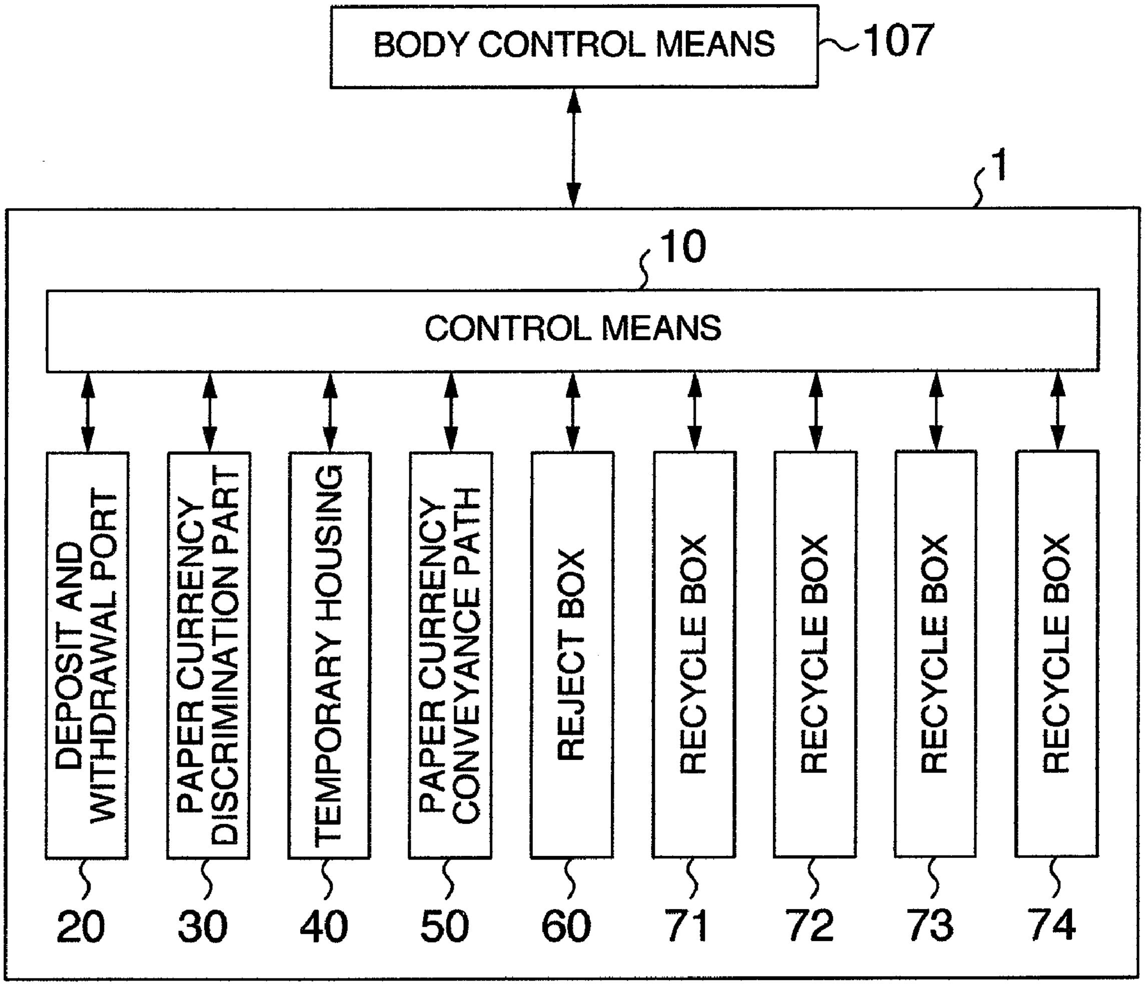
FIG. 3 is a control block diagram illustrating control relation of the paper currency handling apparatus inside an automatic cash dealing apparatus.

FIG. 3 is a control block diagram illustrating control relation of the paper currency handling apparatus 1 arranged in the automatic cash dealing apparatus 101.

The control part 10 of the paper currency handling apparatus 1 is connected to the body control part 107 of the automatic cash dealing apparatus 101 through wiring; controls the paper currency handling apparatus 1 according to commands from the body control part 107 and detection on the state of the paper currency handling apparatus 1 being a deposit and withdrawal machine; and sends the state of the paper currency handling apparatus 1 to the body control part 107 as required.

The paper currency handling apparatus 1 also includes a drive motor, an electromagnetic solenoid, and a sensor and the like (not illustrated in the drawing) in the respective units (a paper currency deposit and withdrawal port 20 as a paper currency deposit and withdrawal part, a paper currency discrimination part 3, a temporary housing 40, a conveyance path 50, a reject box 60 and recycle boxes 71 to 74 as paper currency housings) to activate and control the actuators (the drive motor and the electromagnetic solenoid and the like) while monitoring states with the sensor according to deals to be described later.

Figure 4:
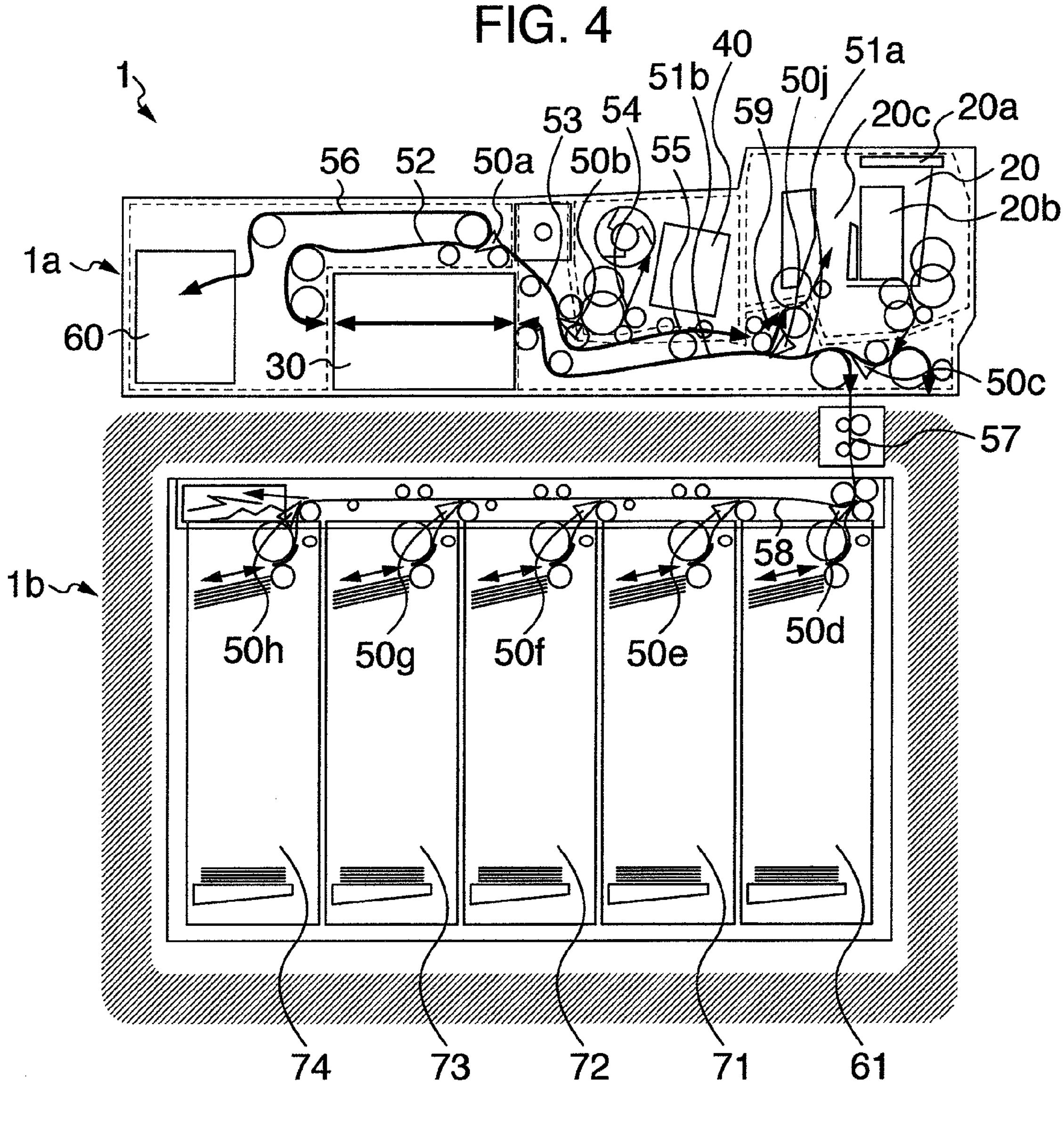
FIG. 4 is a sectional side elevation illustrating a configuration of the paper currency handling apparatus.

FIG. 4 is a sectional side elevation illustrating a configuration of the paper currency handling apparatus 1.

The paper currency handling apparatus 1 is roughly divided into and configured by an upper paper currency mechanism 1*a* and a lower paper currency mechanism 1*b*.

The upper paper currency mechanism 1*a*, to which mechanisms necessary for exchanging paper currencies mainly with users are integrated, is configured by a paper currency deposit and withdrawal port 20 for users to put in and take out paper currencies, a paper currency discrimination part 30 discriminating paper currencies, a temporary housing 40 for temporarily housing the deposited paper currencies up to completion of a deal; a reject box 60 housing paper currencies not served for withdrawal; and a control part 10. Here, in FIG. 4, the control part 10 is not illustrated but omitted. In addition, the temporary housing 40 comprises space for temporarily housing paper currencies, a conveyance roller, an impeller and the like for accumulating paper currencies in the space and is unitized as illustrated with broken lines in the drawing.

The lower paper currency mechanism 1*b* is provided with a plurality of recycle boxes 71 to 74 for housing the deposited paper currencies according to monetary types and letting out paper currencies to be withdrawn.

For detailed description on the upper paper currency mechanism 1*a*, the paper currency deposit and withdrawal port 20 is arranged on the forefront side to become a service interface and the temporary housing 40 is arranged behind the paper currency deposit and withdrawal port 20 adjacently. Behind the temporary housing 40, a paper currency discrimination part 30 is arranged a little apart from the temporary housing 40.

The paper currency deposit and withdrawal port 20 is configured by a paper currency let-out part 20*b* letting out downward a paper currency put in from above in the state where the upper shutter 20*a* is open and a paper currency accumulation part 20*c* accumulating paper currencies conveyed from downward in series arrangement in this order.

The lower end of the paper currency let-out part 20*b* is connected to the forward surface of the paper currency discrimination part 30 with a conveyance path 51*a* and a conveyance path 51*b* as a first conveyance path extending in the backward and forward directions. Midway in the conveyance path 51*a*, a paper currency sorting gate 50*c* is provided as a second branch part for sorting paper currencies to the lower paper currency mechanism 1*b*.

The rear face of the paper currency discrimination part 30 is connected to the rear lower part of the temporary housing 40 with conveyance paths 52, 53 and 54 as a second conveyance path. The conveyance path 52 temporarily rises upwards from substantially center part in the vertical direction of the rear face of the paper currency discrimination part 30; goes substantially horizontally above the paper currency discrimination part 30 in the forward direction; and is connected to the paper currency sorting gate 50*a* as the first branch part provided in an upper position in the vicinity of the forward face of the paper currency discrimination part 30.

The paper currency sorting gate 50*a* is arranged in an upper position behind the temporary housing 40 and in a position closer to the back surface of the temporary housing 40 as much as possible. In addition, the paper currency sorting gate 50*a* is positioned behind the forward surface of the paper currency discrimination part 30 and above the upper surface of the paper currency discrimination part 30. For the example 1, from the paper currency discrimination part 30, the paper currency sorting gate 50*a* is arranged in a position in the vicinity of the upper forward part of the paper currency discrimination part 30.

The conveyance path 53 progresses forward-obliquely in the downward direction from the paper currency sorting gate 50*a* and is connected to the paper currency sorting gate 50*b* provided below and behind the temporary housing 40. The conveyance path 54 establishes connection between the paper currency sorting gate 50*b* and the temporary housing 40.

Connection between the paper currency sorting gate 50*b* and the lower end of the paper currency accumulation part 20*c* is established by the conveyance path 55. The conveyance path 55 extends substantially horizontally in the forward and backward directions. Accordingly, connection between the back of the paper currency discrimination part 30 and the paper currency accumulation part 20*c* is established by the conveyance paths 52, 53 and 55.

Connection between the paper currency sorting gate 50*a* and the forward upper end of the reject box 60 is established by the conveyance path 56. The conveyance path 56 extends backward from the paper currency sorting gate 50*a* substantially horizontally and thereafter goes downward and backward-obliquely.

The lower part of the paper currency sorting gate 50*c* provided midway in the conveyance path 51*a* connecting the paper currency deposit and withdrawal port 20 to the paper currency discrimination part 30 is provided with a conveyance path 57 as a third conveyance path to exchange paper currencies with the lower paper currency mechanism 1*b*. The conveyance path 57 extends upward and downward.

In addition, a paper currency sorting gate 50*j* is provided between the conveyance path 51*a* and conveyance path 51*b*. A conveyance path 59 is provided as a fourth conveyance path establishing connection between the paper currency sorting gate 50*j* and the paper currency accumulation part 20*c*. Thereby, the paper accumulation part 20*c* of the paper currency deposit and withdrawal port 20 is configured to be capable of housing paper currencies conveyed in any of the forward and backward directions from the paper currency discrimination part 30 and discriminated.

At least the conveyance paths 51*b*, 52, 53, 54 and 57 among those conveyance paths are configured so that a paper currency can be conveyed in any direction from upstream to downstream and from downstream to upstream.

Thus, from upstream to downstream, the paper currency let-out part 20*b* of the deposit and withdrawal port 20, the conveyance paths 51*a* and 51*b*, the paper currency discrimination part 30, the conveyance path 52, the paper currency sorting gate 50*a*, the conveyance path 53, the paper currency sorting gate 50*b*, the conveyance paths 55 and 59, and the paper currency accumulation part 20*c* are connected in this order.

The lower paper currency mechanism 1*b* is provided with recycle boxes 71 to 74 for housing and letting out paper currencies again on the basis of monetary type. A housing box 61 housing paper currencies not served for recycling is mounted further. In addition, above the respective recycle boxes 71 to 74 and the housing box 61, a substantially horizontal conveyance path 58 connected to the conveyance path 57 provided in the lower part of the upper paper currency mechanism 1*a* and being bi-directionally conveyable is provided to extend backward and forward. Moreover, above the recycle boxes 71 to 74 and the housing box 61, paper currency sorting gates 50*d* to 50*h* for sorting paper currencies to be housed respectively are provided.

Next, operations of the paper currency handling apparatus 1 at the occasion of deposit deal processing will be described.

The paper currency let-out part 20*b* of the paper currency deposit and withdrawal port 20 separates and lets out downward a plurality of deposited paper currencies one by one. The paper currencies let out downward from the paper currency let-out part 20*b* are conveyed backward substantially horizontally by the conveyance paths 51*a* and 51*b* and pass backward from the forward surface through the paper currency discrimination part 30. The paper currency discrimination part 30 discriminates authenticity, monetary types and a state with or without defects on the passing paper currencies with the internally mounted sensor and the like.

A paper currency having passed through the paper currency discrimination part 30 is temporarily conveyed upward by the conveyance path 52 from the back surface of the paper currency discrimination part 30 and is further conveyed substantially horizontally in the forward direction. During conveyance by that conveyance path 52, discrimination by the above described paper currency discrimination part 30 is completed and the paper currency sorting gates 50*a* and 50*b* are switched based on the discrimination result.

In the case where a paper currency is discriminated to be acceptable by the paper currency discrimination part 30, the paper currency sorting gates 50*a* and 50*b* are switched toward the temporary housing 40 and the paper currency is conveyed downward and forward by the conveyance paths 53 and 54 to accumulate the paper currency inside the temporary housing 40.

In the case where the paper currency is discriminated to be unacceptable by the paper currency discrimination part 30, the paper currency sorting gates 50*a* and 50*b* are switched toward the paper currency accumulation part 20*c*. The paper currency is housed in paper currency accumulation part 20*c* as deposit rejected paper currency and, thereafter, moves to the lower part of the shutter 20*a* by a push plate not illustrated in the drawing. Thereafter, the shutter 20*a* opens and the paper currency is returned to the user.

All paper currencies thus put in to the paper currency deposit and withdrawal port 20 are processed; the deposited amount of money corresponds to the amount of money counted by the paper currency handling apparatus 1; and a user inputs deposit dealing confirmation with the customer operation part 105 (see FIG. 2). Then housing processing is carried out for housing the paper currency temporarily housed in the temporary housing 40 into the recycle boxes 71 to 74.

The housing processing switches the paper currency sorting gates 50*a* and 50*b* at first so as to establish connection between the temporary housing 40 and the paper currency discrimination part 30 and switches the paper currency sorting gate 50*c* so as to establish connection between the paper currency discrimination part 30 and the conveyance path 57.

Paper currencies let out by the temporary housing 40 one by one are conveyed to the paper currency discrimination part 30 through the conveyance path 54, the paper currency sorting gate 50*b*, the conveyance path 53, the paper currency sorting gate 50*a* and the conveyance path 52. The paper currencies having passed the paper currency discrimination part 30 are conveyed by the conveyance paths 51*b* and 51*a* and are conveyed to the conveyance path 57 by the paper currency sorting gate 50*c*. The paper currencies are conveyed by the conveyance path 58 of the lower paper currency mechanism 1*b*, sorted by the paper currency sorting gates 50*d* to 50*h* switched based on types of money or the like and housed in any one of the housing box 61 and the recycle boxes 71 to 74.

Here, in the case of adopting a configuration in which monetary types of paper currencies and the like are discriminated by the paper currency discrimination part 30 during that housing processing and the paper currency sorting gates 50*d* to 50*h* are switched as a result of that discrimination, discrimination is completed to enable switching of the paper currency sorting gates 50*d* to 50*h* while the paper currencies are being conveyed by the conveyance paths 51*b*, 51*a* and 57.

Next, operations carried out by the paper currency handling apparatus 1 at the occasion of a withdrawal dealing process will be described.

For the withdrawal dealing process, a predetermined number of paper currencies are let out one by one from the respective recycle boxes 71 to 74 on the basis of the type of money. The paper currencies let out are conveyed to the paper currency discrimination part 30 by the conveyance paths 58, 57, 51*a* and 51*b*.

The paper currency discrimination part 30 discriminates whether a passing paper currency is or is not an allowable withdrawal paper currency.

In the case of an allowable withdrawal paper currency, the paper currency sorting gates 50*a* and 50*b* are switched to establish connection between the paper currency discrimination part 30 and the paper currency accumulation part 20*c* and the paper currency is conveyed up to the paper currency accumulation part 20*c* by the conveyance paths 52, 53 and 55 to accumulate paper currencies in the paper currency accumulation part 20*c*.

In case of an unallowable withdrawal paper currency, the paper currency sorting gate 50*a* is switched to establish connection between the paper currency discrimination part 30 and the reject box 60 and the paper currency is conveyed to the reject box 60. That discrimination and the switching of the paper currency sorting gates 50*a* and 50*b* as a result of discrimination is completed while the paper currency is being conveyed by the conveyance path 52.

Thus, when the conveyance operation of the paper currency is over, the shutter 20*a* of the paper currency deposit and withdrawal port 20 is opened. Then the paper currencies accumulated in the paper currency accumulation part 20*c* will be in the state where users can get out the paper currencies. When paper currencies are got out by a user, the shutter 20*a* will be closed. Then the withdrawal process is over.

A paper currency handling apparatus 1 persistent to the demand for reduction in size and increase in capacity can be provided by the above described configuration and operations. In detail, the deposit and withdrawal port 20, the temporary housing 40 and, the paper currency discrimination part 30 are arranged in line from forward to backward in this order. The conveyance paths 51 to 55 are arranged along the circumference of those paper currency deposit and withdrawal port 20, temporary housing 40 and the paper currency discrimination part 30. Therefore the extra space is deleted to use the space efficiently. Thereby the upper paper currency mechanism 1*a* can be made compact and small.

In particular, the conveyance path 52 being downstream immediately after the paper currency discrimination part 30 rises upward at the rear exit of the paper currency discrimination part 30; changes its direction toward ahead of the apparatus above the paper currency discrimination part 30; and is connected to the paper currency sorting gate 50*a* mounted in the vicinity of the temporary housing 40; and, therefore, can also be used as the conveyance path for buying time required for the discrimination processing. Thereby, it is not necessary to provide a conveyance path dedicated for waiting for the discrimination result between the paper currency discrimination part 30 and the temporary housing 40 as in the conventional cases but efficient implementation without waste becomes feasible.

In addition, the conveyance paths 52 and 56 mounted above the paper currency discrimination part 30 extend substantially horizontally in the forward and backward directions. Therefore, only the conveyance belt for conveying paper currencies needs to be implemented so size reduction of the implementation space in the height direction can be achieved. Therefore, even the total of the reduction in implementation space in the height direction even for the paper currency discrimination part 30 and the conveyance paths 52 and 56 thereabove will become feasible.

In addition, the implementation space of the conveyance paths 52 and 56 in the height direction is reduced. Thereby, that height can be sufficiently reduced even compared with the paper currency deposit and withdrawal port 20 and the temporary housing 40. The respective units of the paper currency deposit and withdrawal port 20, the temporary housing 40 and the paper currency discrimination part 30 in the upper paper currency mechanism 1*a* can be mounted substantially horizontally. Thereby, the height of the upper paper currency mechanism 1*a* can be reduced.

In addition, also in the depth direction, only space sufficient for arranging and mounting the paper currency deposit and withdrawal port 20, the temporary housing 40 and the paper currency discrimination part 30 will be satisfactory. The space for the conveyance path dedicated for waiting for the result of discrimination to be provided in the back stage of the paper currency discrimination part 30 will become unnecessary and reduction in size also in the depth direction becomes possible.

In addition, in general, the paper currency housing box (recycle boxes 71 to 74 in the present example) is mounted under the upper paper currency mechanism 1*a*. The conveyance route to the temporary housing 40 is caused to rise upward from the back of the paper currency discrimination part 30 to pass above the paper currency discrimination part 30 and is connected to the temporary housing 40. Thereby, that conveyance route and the conveyance route from the temporary housing 40 to the recycle boxes 71 to 74 under the upper paper currency mechanism 1*a* do not cross so more efficient implementation becomes possible.

In addition, paper currencies accumulated in the temporary housing 40 can be conveyed to the paper currency discrimination part 30 by the conveyance path 59 to be returned to the paper currency deposit and withdrawal port 20 after discrimination. In addition, in the case where cancellation and the like of a deal occurs in the midst of the time of a deposit deal and the like, and in the case of returning the paper currencies accumulated in the temporary housing 40, the return paper currency can be counted and returned by the conveyance path 59. In addition, the conveyance path 59 will deprive of necessity of providing a separate conveyance route for conveying the paper currencies let out from the temporary housing 40 directly to the paper currency deposit and withdrawal port 20. Due to the necessity of the operation for conveying the paper currency let out from the temporary housing 40 to the paper currency discrimination part 30 through the conveyance paths 54, 53 and 52 with paper currency housing operations and the like, it is structurally difficult to switch to the side of the paper currency deposit and withdrawal port 20 and the side of the conveyance path 54 immediately after a let-out operation from the temporary housing 40. However, by providing the conveyance path 59 in communication with the paper currency accumulation part 20*c* of the paper currency deposit and withdrawal port 20 midway in the conveyance path 51*b* as described above, conveyance to the paper currency deposit and withdrawal port 20 can be realized.

In addition, by reducing the height of the upper paper currency mechanism 1*a* in the upward and downward directions, while the height of the paper currency handling apparatus 1 in its entirety is kept as in the conventional cases, the height of the housing box 61 and the recycle boxes 71 to 74 can be increased to enable increase in housing amount of paper currency in the housing box 61 and the recycle boxes 71 to 74.

In addition, the reject box 60 is provided ahead of the paper currency sorting gate 50*a*. Thereby, after the conveyance path 52 saves the distance required for discrimination in the paper currency discrimination part 30, the paper currencies can be conveyed to the reject box 60.

Here, the above described example is configured by one-way conveyance path 51*a* from the front to the rear. However, this conveyance path 51*a* can be realized by a bi-directionally conveyable path. Thereby, the paper currencies remaining in the conveyance paths 51*a*, 51*b* and the like will become returnable to the paper currency deposit and withdrawal port 20 by reversing the conveyance paths 51*a*, 51*b* and the like. In particular, for the conveyance path inside the paper currency discrimination part 30, it is necessary to narrow thickness of the conveyance path for performance of the sensor for discrimination. Therefore, in the case where a paper currency remains between the paper currency discrimination part 30 and the paper currency deposit and withdrawal port 20, rather than returning paper currencies to the deposit and withdrawal port through the paper currency discrimination part 30, by reversing the conveyance paths 51*a* and 51*b* to return the paper currencies directly to the paper currency deposit and withdrawal port 20, paper currencies become returnable to the paper currency deposit and withdrawal port 20 in a more assured fashion. The paper currency handling apparatus 1 will be able to continue dealing by opening the shutter 20*a* on the upper surface to return paper currencies given back to the paper currency deposit and withdrawal port 20 to a user and to have the user to put in the paper currencies again.

In addition, in the above described example 1, the conveyance path 51*a* is provided midway with a paper currency sorting gate 50*c* connected to the conveyance path 57 to the lower paper currency mechanism 1*b*. The paper currency sorting gate 50*c* can be made movable in the forward and backward directions. Otherwise, a plurality of paper currency sorting gates 50*c* can be provided and divided at a plurality of sites.

Figure 5:
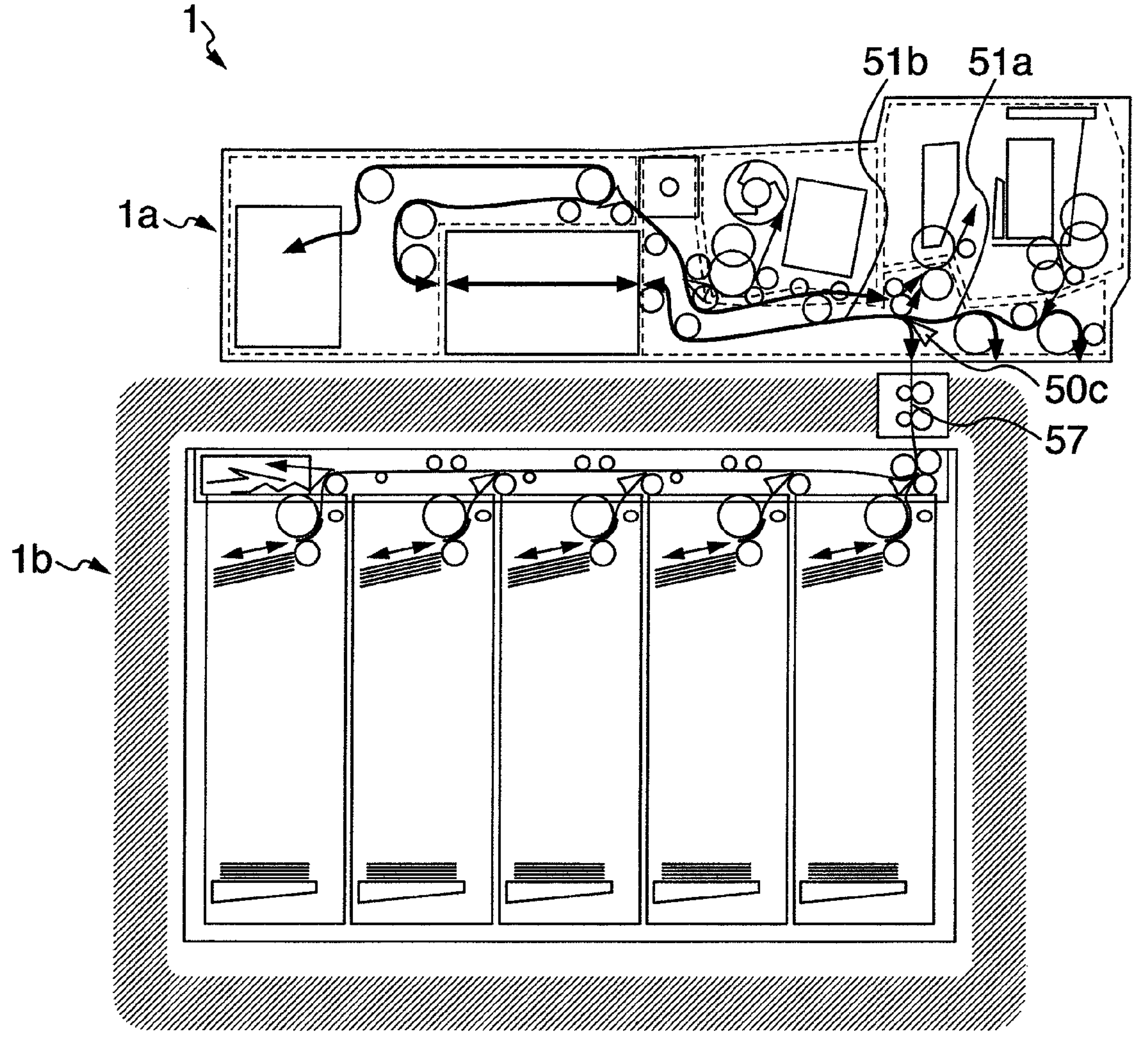
FIG. 5 is a sectional side elevation illustrating another arrangement of a paper currency handling apparatus.
Figure 6:
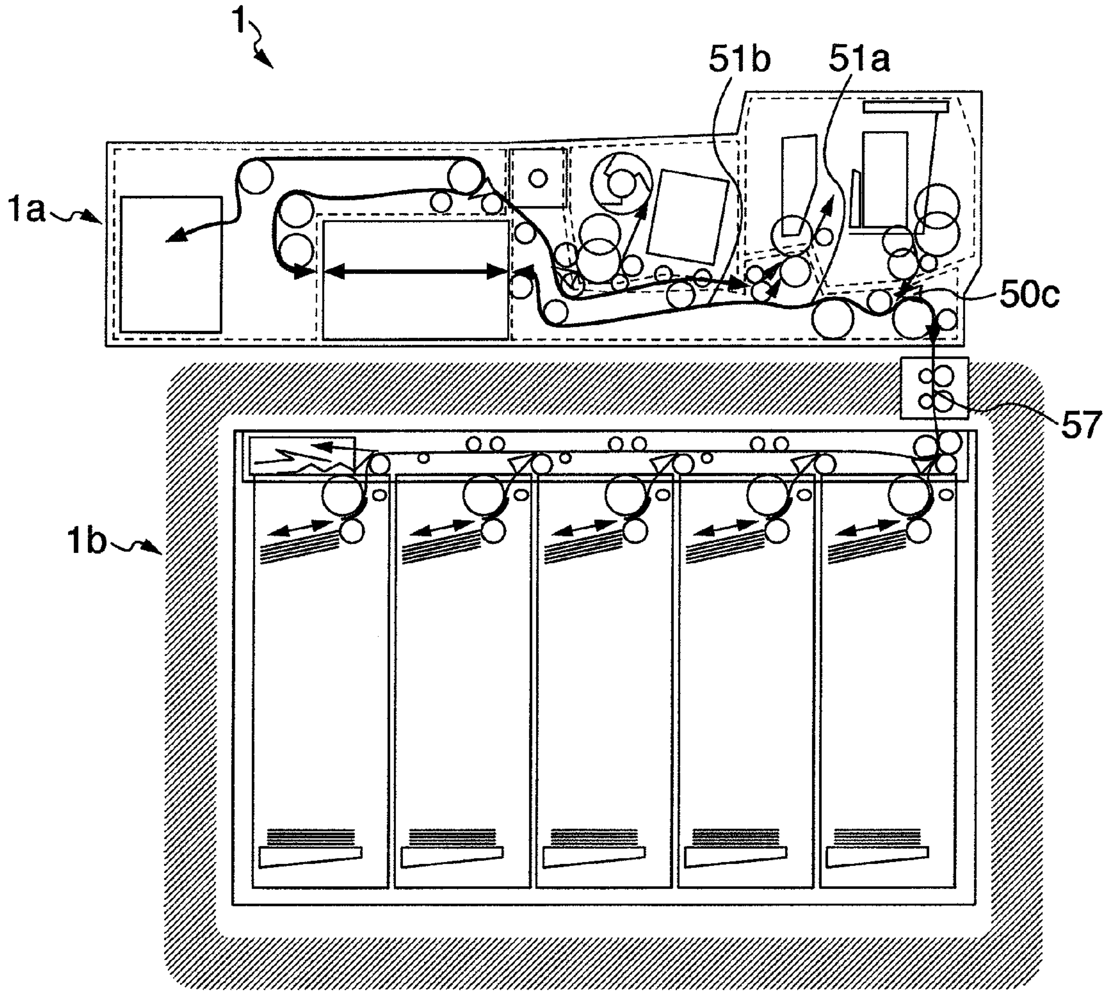
FIG. 6 is a sectional side elevation illustrating still another arrangement of a paper currency handling apparatus.

Thereby, for the convenience of implementation to an apparatus such as an automatic cash dealing apparatus 101, the case of an occurrence of necessity of displacing the implementation position of the upper paper currency mechanism 1*a* with respect to the lower paper currency mechanism 1*b* in the forward and backward directions can be easily dealt with by changing the position of the paper currency sorting gate 50*c*. For example, FIG. 5 illustrates an example of the upper paper currency mechanism 1*a* subjected to forward displacement from the implementation state illustrated in FIG. 4. FIG. 6 illustrates an example of the upper paper currency mechanism 1*a* subjected to backward displacement.

The present invention will not be limited only to the configuration of the above described embodiment but a lot of embodiments can be obtained.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A paper currency handling apparatus comprising:

a paper currency deposit and withdrawal part including a paper currency let-out part letting out a put-in paper currency and a paper currency accumulation part accumulating a paper currency to be discharged;

a paper currency discrimination part discriminating a paper currency;

a temporary housing for temporarily accumulating and storing a paper currency;

a paper currency housing to house and separate paper currencies again;

a first conveyance path conveying a paper currency from below the paper currency let-out part to ahead of the paper currency discrimination part;

a second conveyance path conveying a paper currency from behind the paper currency discrimination part to the temporary housing once ascending upward;

a first branch part going from behind the paper currency discrimination part to the second conveyance path to implement sorting to conveying destinations for a first time;

a second branch part, midway in the first conveyance path, switching a conveyance direction toward the paper currency housing; and a third conveyance path conveying a paper currency from the second branch part to the paper currency housing;

wherein the temporary housing is arranged behind the paper currency deposit and withdrawal part;

wherein the paper currency discrimination part is arranged behind the temporary housing;

wherein the first branch part is arranged in an upper part behind the temporary housing; and wherein at least one of (1) a portion of the first conveyance path is configured to extend at least from the paper currency discrimination part to the second branch part, (2) a portion of the second conveyance path is configured to extend at least from the temporary housing to the paper currency discrimination part, and (3) the third conveyance path is configured to be bi-directionally conveyable.

2. The paper currency handling apparatus according to claim 1, wherein a portion of the first branch part is configured to rise upward from behind the paper currency discrimination part and then head for a front part of the paper currency discrimination part along an upper surface of the paper currency discrimination part.

3. The paper currency handling apparatus according to claim 2, further comprising:

a fourth conveyance path conveying a paper currency from ahead of the paper currency discrimination part to the paper currency accumulation part, wherein a paper currency let out from the temporary housing is discriminated by the paper currency discrimination part and is conveyable to the paper currency accumulation part.

4. The paper currency handling apparatus according to claim 2, further comprising:

a reject box for housing a reject paper currency;

wherein the first branch part is configured to switch a conveyance direction from the paper currency discrimination part in the second conveyance path to the temporary housing and the reject box.

5. The paper currency handling apparatus according to claim 2, wherein the first conveyance path is configured to be bi-directionally conveyable in an entire portion extending from the paper currency let-out part to the paper currency discrimination part.

6. The paper currency handling apparatus according to claim 1, further comprising a fourth conveyance path conveying a paper currency from ahead of the paper currency discrimination part to the paper currency accumulation part, wherein a paper currency let out from the temporary housing is discriminated by the paper currency discrimination part and is conveyable to the paper currency accumulation part.

7. The paper currency handling apparatus according to claim 6, wherein the second conveyance path is configured to be capable of conveying a paper currency from behind the paper currency discrimination part to the paper currency accumulation part.

8. The paper currency handling apparatus according to claim 1, further comprising:

a reject box for housing a reject paper currency;

wherein the first branch part is configured to switch a conveyance direction from the paper currency discrimination part in the second conveyance path to the temporary housing and the reject box.

9. The paper currency handling apparatus according to claim 3, wherein the second conveyance path is configured to be capable of conveying a paper currency from behind the paper currency discrimination part to the paper currency accumulation part.

10. The paper currency handling apparatus according to claim 1, wherein the first conveyance path is configured to be bi-directionally conveyable in an entire portion extending from the paper currency let-out part to the paper currency discrimination part.

* * * * *